(12) United States Patent
Shmerl

(10) Patent No.: US 10,255,233 B2
(45) Date of Patent: Apr. 9, 2019

(54) SYSTEM AND METHOD FOR ORGANIZING, RETRIEVING AND DISPLAYING INFORMATION USING HTML INDICES

(71) Applicant: Y. Jerry Shmerl, Greenbelt, MD (US)

(72) Inventor: Y. Jerry Shmerl, Greenbelt, MD (US)

(*) Notice: Subject to any disclaimer, the term of this patent is extended or adjusted under 35 U.S.C. 154(b) by 574 days.

(21) Appl. No.: 15/153,194

(22) Filed: May 12, 2016

(65) Prior Publication Data

US 2016/0335280 A1 Nov. 17, 2016

Related U.S. Application Data

(60) Provisional application No. 62/160,322, filed on May 12, 2015.

(51) Int. Cl.
G06F 16/30 (2019.01)
G06F 16/16 (2019.01)
G06F 16/14 (2019.01)

(52) U.S. Cl.
CPC .......... G06F 16/164 (2019.01); G06F 16/14 (2019.01); G06F 16/168 (2019.01)

(58) Field of Classification Search
CPC ....... G06F 16/14; G06F 16/164; G06F 16/168
See application file for complete search history.

(56) References Cited

U.S. PATENT DOCUMENTS

| | | | | |
|---|---|---|---|---|
| 8,122,070 B1* | 2/2012 | Eshkenazi | ............... | H04L 63/08 707/822 |
| 2003/0120680 A1* | 6/2003 | Agrawal | ............... | H04L 67/104 |
| 2007/0022135 A1* | 1/2007 | Malik | ............... | G06F 16/955 |
| 2007/0033200 A1* | 2/2007 | Gillespie | ............... | G06Q 10/10 |
| 2009/0018996 A1* | 1/2009 | Hunt | ............... | G06Q 30/02 |
| 2010/0306176 A1* | 12/2010 | Johnson | ............... | G06F 16/125 707/664 |
| 2012/0092346 A1* | 4/2012 | Ording | ............... | G06F 3/0481 345/473 |
| 2013/0311557 A1* | 11/2013 | Motes | ............... | G06F 3/0482 709/204 |
| 2014/0222917 A1* | 8/2014 | Poirier | ............... | H04L 65/403 709/204 |

OTHER PUBLICATIONS

Article entitled "Richer File SYstem Metadata Using Links and Attributes", by Ames et al., dated 2005.*

* cited by examiner

*Primary Examiner* — Mahesh H Dwivedi
(74) *Attorney, Agent, or Firm* — Royal W. Craig; Gordon Feinblatt LLC

(57) ABSTRACT

A computerized system and method for data management that packages data in the inherent folder hierarchy of the operating system, and layers a virtual folder/file hierarchy and directory system atop the inherent folder hierarchy. The virtual folder/file hierarchy provides non-hierarchical HTML search and indexing on top of the existing Windows® file systems. HTML scripts tag files with keywords indicating topic, subtopic, and levels, and provide an HTML-based user interface that searches known paths by tags. The versatility of complete, customized streamlining, full detail, and multiple levels of detail in between, is also delivered. Altogether this provides intuitive, pinpoint classified subject/sub-topic/s nested to any desired level, plus a personalizable, much more useful information hierarchy for faster, easier access and navigation to desired information, in addition to numerous unique features, such as multiple unique perspectives of information, all based on the unique, customized subject/sub-topic/s orientation.

13 Claims, 4 Drawing Sheets

```
Showing "Least" for:    psaAndProstateResearch    (Options: Least {2L}Less {2L}More 3Lev 4Lev All)

o (as 5732)            ^ v o Overview: (skip) Info.

>>   1/3 > highPsaProb    o   f
<<>> 2/3 > prostateCancer o   f
<<   3/3 (Any items indented below, are either completed, or are no longer being considered:)
```

FIG. 2

```
Showing "Less" for:    psaAndProstateResearch    (Options: Least {2L}Less {2L}More 3Lev 4Lev All)

o (as 5732)
                                                          ^ v
o Overview: (skip) Info.

>>   1/3. > highPsaProb    o   f

<<>> 2/3. > prostateCancer o   f
     > 2-1 /. > oncologistsPhoneNumsAndReviews\research   o   f <<   3/3. (Any items indented below, are either completed, or are no longer being considered:)
     > 3-1 /.
```

FIG. 3

```
Showing "All" for:   psaAndProstateResearch\prostateCancer\oncologistsPhoneNumsAndReviews\research o (as 5737)
                                              (Options: Least {2L}Less {2L}More 3Lev 4Lev All)
o Overview: (skip) Info.

>>   1/3. Best Oncologists
                                     ^ v u t

> 1-1 /. Best Rated Oncologist / Hematologists near MD Link

> 1-2 /. THE TOP PROSTATE CANCER SPECIALISTS Link

> 1-3 /. Richard B. Alexander, MD (oncology) Link    Link
        o Located at University of Maryland Medical Center (UMMC).

<<>> 2/3. Best Treatment Centers

> 2-1 /. U.S. News & World Report, Top-Ranked Hospitals for Cancer Link

> 2-2 /. Newsmax, Prostate Cancer: Top 10 Treatment Centers Link

> 2-3 /. Becker's Hospital Review, 100 Hospitals and Health Systems With Great Oncology Programs Link > 2-4 /. Mens health, The Best Cancer Hospitals in the U.S. Link > 2-5 /. U.S. News & World Report, "A Patient's Guide to Hospitals" Link > 2-6 /. American Cancer Society, Choosing the best prostate cancer treatment for you Link 1 2 ^ v u t
     > 2-7 /. A book from Johns Hopkins "Choosing The Right Treatment For Prostate Cancer" Link > 2-8 /. The Chesapeake Urology Prostate Center for Radiation Therapy - See more at: Link <<   3/3. (Any items indented below, are either completed, or are no longer being considered:)

SYSTEM AND METHOD FOR ORGANIZING, RETRIEVING AND DISPLAYING INFORMATION USING HTML INDICES

CROSS-REFERENCE TO RELATED APPLICATION(S)

The present application derives priority from U.S. Provisional Patent Application Ser. No. 62/160,322 filed May 12, 2015.

BACKGROUND OF THE INVENTION

1. Field of the Invention

The present invention relates to a computer system and software method for organizing and managing information and, more particularly, to a system that layers non-hierarchical HTML search and indexing on top of an existing Windows® file system.

2. Description of the Background

File systems have been hierarchical since early software in order to provide the ability to organize data. Of course, this requires identification using a file path, e.g., C:/users/rwcraig/stuff/notes/caldndar/telephone.txt to uniquely identify any file, directory or other named resource. Modern high-end computing (HEC) systems must manage petabytes and exabytes of data stored in billions of files, and hierarchical file systems are cumbersome. Foldering is the process of grouping documents. A folder hierarchy can be used as a classification method to categorize documents, helping to narrow a search space for documents and providing a natural method of navigating documents. Examples of providing the folder hierarchy can be found in file systems such as, for example, the NTFS on Windows platforms, or in an email repository such as, for example, Lotus Notes®. Conventional foldering mechanisms require a user to manually maintain the placement of documents in a folder within a folder hierarchy. When the content of a document is changed, users have to determine a location for the document within the folder hierarchy that matches the new content of the document. The possibility of misplacing documents in a folder hierarchy is relatively high. Once the document is misplaced, it can be difficult to locate. It is cumbersome to place/assign billions of files in their rightful individual folders.

Auto foldering systems address the issues of manual foldering. Conventional auto foldering systems automatically place the documents in folders using a predefined criterion based on the properties or content of the document. However, if changes in the content of such a document occur frequently the processing overhead involved in reevaluating the foldering criteria and placing the document in appropriate folders is too much. Different programs use different naming conventions and save files to their own directory, which can make it difficult for users to find their way back to the files. Programs often have default directories and places they save documents. A user often has to search through their hard disk and make guesses about where a file is stored. Related items are also often stored in separate places. Related files that a user has may be stored on different parts of the hard disk, etc. This problem becomes more common with the developments of digital media services that have multiple content types (e.g., pictures, music, video).

This is especially true on a network where files are distributed and it is very difficult for users to find or return to files. Users typically have to memorize or map the various sites and names that they need for finding files on a network. Moreover, "networks" include the internet where multiple users maybe collaborating on multiple documents scattered across a cloud-based environment. Linking web-based collections of documents in a useful manner is impossible. What is needed is a non-hierarchical file system.

In document databases and electronic filing systems there is provided an area in which keywords or attributes can be written in documents. By using the keywords or attributes, it is possible to retrieve documents and to pick up only desired documents by using retrieval query. This is characteristic of web pages, where linking is done by providing metadata links on each web page to other web pages or documents. A user may click on one of the links appearing on the web page in a browser to navigate to the other web page or document. The creation of the links on each web page may be performed by a web author or designer by inserting a URL (Uniform Resource Locator) for each link appearing on the web page. However, creating and designing a web page by typing in URLs is typically tedious, error prone and very time consuming. In addition, updating links that are scattered across several interconnected web pages can be a real chore.

What is needed is a computer system and software method for streamlined data management that packages data in the inherent folder hierarchy of the operating system, eliminating the need to create a dedicated folder hierarchy outside of what is inherently provided by the operating system, yet also layers there atop a data management system that employs metadata links on each document for filtering and organizing items based on common elements

SUMMARY OF THE INVENTION

Accordingly, it is an object of the invention to provide a computerized system and method for filtering and organizing files in a computer environment based on a virtual file system that is compatible with and existent atop the conventional hierarchical directory structures and physical file storage devices. The end user may continue to use the file storage system in the same fashion to which they have become accustomed. In addition, application programs may continue to use the file storage system without modification. However, the virtual directory and navigation system can seamlessly link with the operating system of the computer to provide a parallel method for organizing, accessing and maintaining the computer system's storage.

The present invention does this with a computerized system and method for uniquely streamlined data management that packages data in the inherent folder hierarchy of the operating system, but layers virtual folder/file hierarchy and directory system atop it, thereby eliminating the need to create a dedicated folder hierarchy outside of what is inherently provided by the operating system. The invention complements the existing file system by layering non-hierarchical HTML search and indexing on top of the existing Windows® file systems. The HTML scripts tag files with keywords indicating topic, subtopic, and levels, and provides an HTML-based user interface that searches known paths by tags. The invention provides intuitive subject/subtopic/s nested to any desired level, limited only by machine storage capacity. The user views topics/subtopic/s using a conventional browser loading a variety of HTML pages formatted. The three basic types of files are Task Control, Detail and Main. A master calendar page is provided to get easy access to task items by date and time. Subordinate calendar pages are provided that do the same with any desired subject/sub-topic(s) of the virtual directory system (alone or in combination)). Additional pages display task items by Subject/Sub-topic/s (in date and time order), by appointments (in date and time order), or by phone calls necessary to be made (in date and time order), among other task item displays using other criteria.

For a more complete understanding of the invention, its objects and advantages refer to the remaining specification and to the accompanying drawings.

BRIEF DESCRIPTION OF THE DRAWINGS

Other objects, features, and advantages of the present invention will become more apparent from the following detailed description of the preferred embodiment and certain modifications thereof, in which:

FIG. 2 is a screenshot showing an example of a "standalone" (see below) version of a 'detail file' index file that defines a top-level hierarchy for a plurality of data files.

FIG. 3 is a standalone version (sec below) screen shot of an exemplary Less {2 L} index page which adds another level of detail and adds a maximum of 2 level 2 subtopics to each top-level bullet in the list of topics (as opposed to the More index page which shows every level 1 and level 2 item).

FIG. 4 is a standalone version (explained below) screen shot of an exemplary All index page which adds another level of detail and adds full detail and adds links to the actual data objects stored within the above hierarchical directory structure.

DETAILED DESCRIPTION OF THE PREFERRED EMBODIMENTS

The present invention is a computerized system and method for streamlined data management using a virtual directory structure and content-based classification structure layered atop a conventional file system such as NTFS, thereby packaging data in the inherent folder hierarchy of the operating system and eliminating the need to change or adapt legacy programs.

The virtual directory system tags each document file with content-based file attribute information about that document. Specifically, each document is tagged with metadata links (or "nodes") to a virtual directory classification index. The classification index is a tree-and-branch configuration including at least two levels: a main table of contents (TOC) and a sub-table of contents (sub-TOC), both providing Task Control, Detail, and Main functionality corresponding to the respective subject/sub-topic(s). The virtual directory system provides a single configurable database of file information which act as links to the actual file data. The database is configurable so that the directory can be manipulated into a new configuration and can make files available at an operating system level.

For purposes of description, the term "standalone" version is herein defined as a copy of a component of the virtual directory system described herein copied for purposes of explanation, but existing outside of the virtual directory system. If desired, a copy of sub-topics of the virtual folder/file hierarchy may be extracted/converted with no impact to either the inherent folder hierarchy of the operating system, or to the virtual directory system. This standalone version maintains an organization that corresponds to the virtual directory system, but it resides outside the virtual directory system. This allows the versatility, if desired, for parts of the virtual directory system to be functional for purposes outside the virtual directory system, such as including the extracted/converted information in an email. Navigation within the standalone version remains intact.

For convenience, the description herein is provided in the context of the Microsoft Windows® operating system. In particular, although the description of the computing system suitable for implementing various features of the invention will include references to the Windows® operating system and security subsystem, those skilled in the art will recognize that the invention may be practiced in the context of other operating systems.

Figure 1:
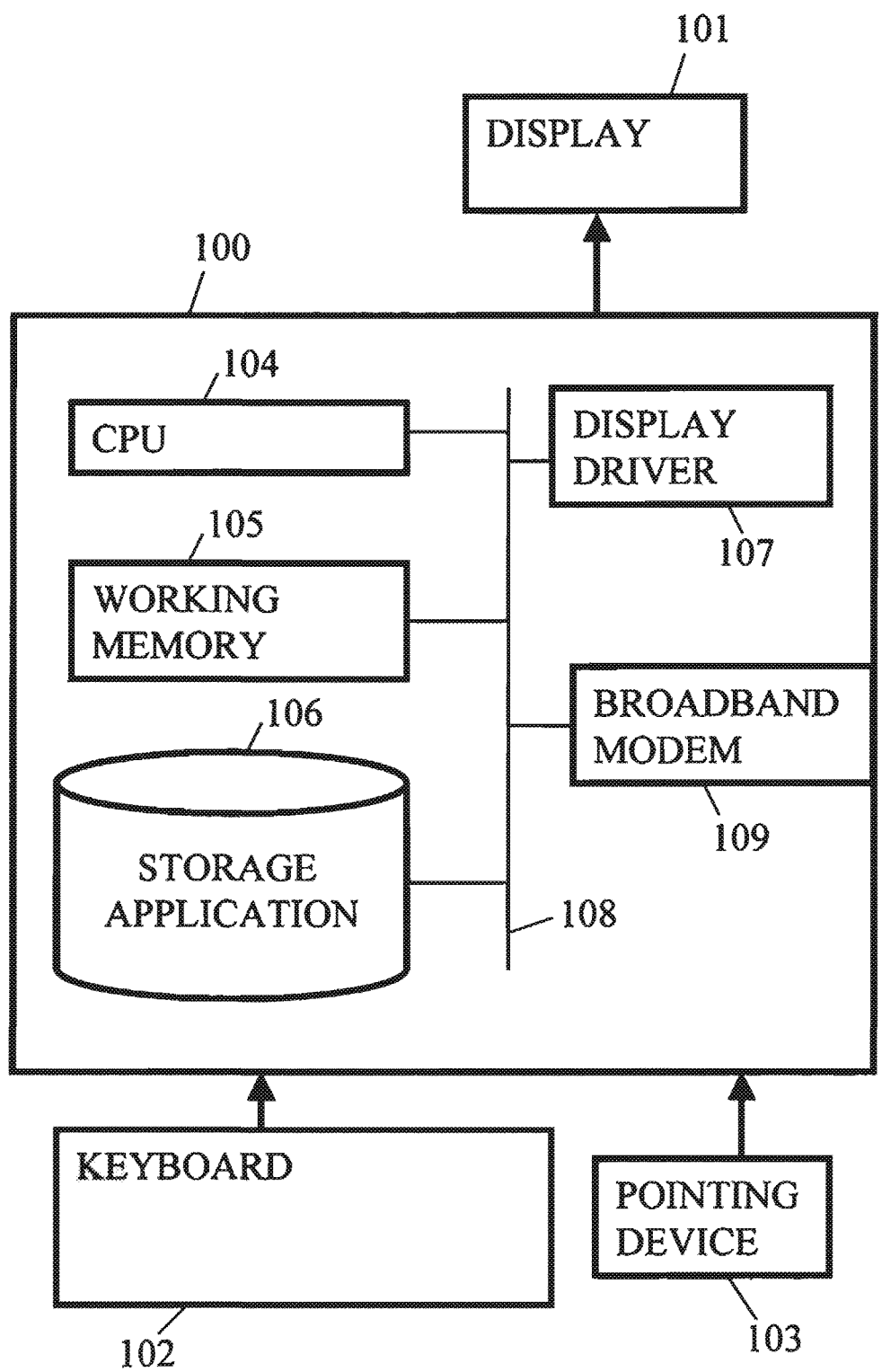
FIG. 1 shows an apparatus according to an embodiment of the invention.

FIG. 1 shows an apparatus according to an embodiment of the invention. The apparatus includes a computer 100 connected to a display 101, a keyboard 102 and a pointing device such as a mouse 103. In this embodiment, the computer 100 includes transitory memory 105, non-transitory memory 106, a CPU 104, a display driver 107, a working memory 105, and a broadband modem 109, all of which are connected to an internal bus 108. The computer 100 is configured to receive user input from the keyboard 102 and mouse 103, select and retrieve information from the information store 106, and output the retrieved information to the display 101. In alternative embodiments, instead of a keyboard and a mouse, a user input device may be provided which is integral with the display 101, e.g. a touch sensitive mechanism provided on the display.

The transitory memory 105 may be RAM used for loading and implementing program code. This code may be retrieved from the non-transitory disk memory 106 for loading into the memory 105.

Data objects are stored on non-transitory disk memory 106, which is formatted and indexed according to a particular disk file system, e.g. FAT, NTFS, HFS, ext2, ISO 9660, UDF. Data on the disk may be stored and organized as data files within the hierarchical directory structure. File management functions such as copy and paste, provided by a computer operating system, e.g. Windows 2000 ™, Mac OS™, Linux™, may be applied to selected files to change their location within the hierarchy. The data objects may include web pages, multimedia files, text files, applets, applications, data files, executable code, upgrades to applications, links to further data objects, or any other type of storable information.

The present invention provides an indexing scheme that links to the data objects, which is readable independently from any of the data files stored within the above hierarchical directory structure. The separate indexing scheme comprises a plurality of linked index files, each defining the hierarchical position of one or more data files. In a preferred embodiment, the index files are stored in a text format, with links written in a mark-up language such as HTML (HyperText Markup Language) that allows navigation to process the information about positions in the content hierarchy. The mark-up language translates the indexing scheme into position information that is readable as a hierarchical position linked to other index files and/or data files.

In accordance with the invention there are three defined index file types: 1) 'task control' related files; 2) 'detail file' related files; and 3) 'main file' (mini-database) related files.

The present invention also provides a user interface which allows for easy navigation and display of all or part of the data objects in accordance with the three defined index file types.

Each of the three defined index file types contains one or more data object links which may include details of any associated files, and user customized file parameters. Data object links may include links to any type of data object. The use of data object links in the navigation index allows a user to maintain their own personalized information hierarchy, using a shared set of source data objects. Thus, users may have new data object links created, and/or moved, copied, or deleted. This is an enormous advantage over previous systems, because the personalized information hierarchy simultaneously allows both the elimination of clutter (the virtual directory contains only folders and files explicitly desired by the user), and delivery of much faster access and navigation to desired information from a single page TOC (described below). Users may also have individual data links set up to store customized parameters. In addition, using index files with data links to other index files and data object files allows associated "sub-files".

FIG. 2 is a standalone version (extracted/converted from the virtual directory system, see above) of a screenshot showing an example of a 'detail file' index file that defines a top-level hierarchy for a plurality of data files. The hierarchy in the virtual directory system (which is the source of this standalone version, explained above) is atop of the disk filing system, and need not modify the existing disk filing system hierarchy, yet it is configurable to adjust to modifications to the disk filing system hierarchy. In this example, the hierarchical information relates to psaAndProstateResearch, and shows the "Least" information for psaAndProstateResearch essentially in a bullet list format of topics. At right, a progression of links to more detailed index files are provided including options: Least {the present screen}, Less {2 L}, More 3Lev 4Lev, All).

Pressing Less {2 L} leads to the screen shown in FIG. 3, which adds another level of detail and adds subtopics to the bullet list of topics.

Pressing More 3Lev 4Lev will add further detail, and finally pressing All leads to the screen shown in FIG. 4, which adds full detail and adds links to the actual data objects stored within the above hierarchical directory structure.

Figure 5:
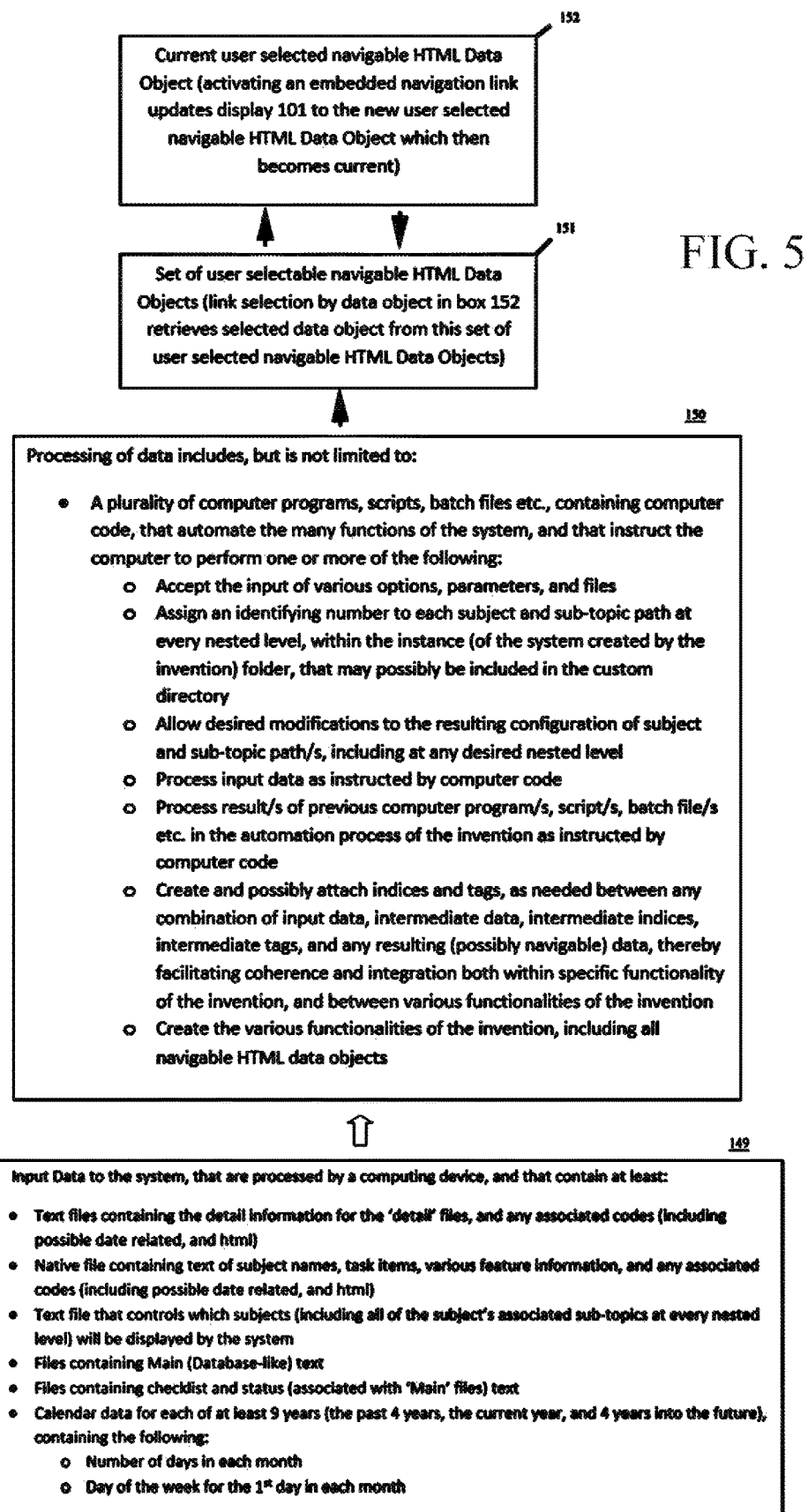
FIG. 5 is a schematic diagram showing how the data on the non-transitory storage 106 can be interfaced to the present file navigation system via HTML/HTML.

FIG. 5 is a schematic diagram showing how the data on the non-transitory storage 106 includes navigable HTML data objects 151, which update the currently displayed navigable HTML data object 152 depending on the user's link selection in navigable HTML data object 152. The user begins with a current user-selected navigable HTML Data Object 152 which contains an embedded set of links to various user-selectable navigable HTML Data Objects 151. Link selection by data object in box 152 retrieves the selected data object from this set of user selected navigable HTML Data Objects 151, and when the user activates an embedded navigation link this updates display 101 to the new user-selected navigable HTML Data Object from 151 (which then becomes current). This is indicated by arrows in both directions between the currently displayed navigable HTML data object 152 and the set of navigable HTML data objects 151. However, in this embodiment, the set of HTML data objects (151) do not modify the data 150 held in the storage means 106, but only receive a copy of this data 150, and so the HTML is processed in a way that the embedded navigation in HTML data objects 151 and 152 can make use of it. Consequently, only a single arrow is shown between the set of navigable HTML data objects 151 and the data 150, indicating data flow out of the information store. The HTML data objects contain all needed data filenames and hierarchical locations. The user selected navigable HTML Data Objects 151 are flexible and configurable via one or more computer programs, scripts, batch files or the like containing computer code, that instruct the computer to perform one or more of the following steps:

Accept the input of various options, parameters, and files;
Assign an identifying number to each subject and subtopic path at every nested level, within the instance (of the system created by the invention) folder, that may possibly be included in the custom directory;
Allow desired modifications to the resulting configuration of subject and sub-topic path's, including at any desired nested level;
Process input data as instructed by computer code;
Process result/s of previous computer program/s, script/s, batch file/s etc. in the automation process of the invention as instructed by computer code;
Create and attach indices and tags, as needed between any combination of input data, intermediate data, intermediate indices, intermediate tags, and any resulting (possibly navigable) data, thereby facilitating coherence and integration both within specific functionality of the invention, and between various functionalities of the invention;
Create the various functionalities of the invention, including all navigable HTML data objects.

Preferably, all links including index file links and data object links in the user interface may be automatically generated from hierarchical data filenames, via HTML or another suitable text processing application. The HTML data objects may contain the results from hierarchical data filenames which have been processed to obtain the location of the corresponding data files within the hierarchy, to then generate corresponding data object links to those locations in the user navigation system.

The above data in information store 106, if not input to the non-transitory data storage 106 via data processing step 150, is input to the non-transitory data storage 106 from data input step 149 by a computing device, and such data contains at least the following:

Text files containing the detail information for the 'detail' files, and any associated codes (including possible date related, and html);
Native file(s) containing text of subject names, task items, various feature information, and any associated codes (including possible date related, and html);
Text file(s) that control which subjects (including all of the subject's associated sub-topics at every nested level) will be displayed by the system;
Files containing Main (Database-like) text;
Files containing checklist and status (associated with 'Main' files) text
Calendar data for each of at least 9 years (the past 4 years, the current year, and 4 years into the future), in each case including the following:
Number of days in each month; and
Day of the week for the 1st day in each month.

Figure 6:
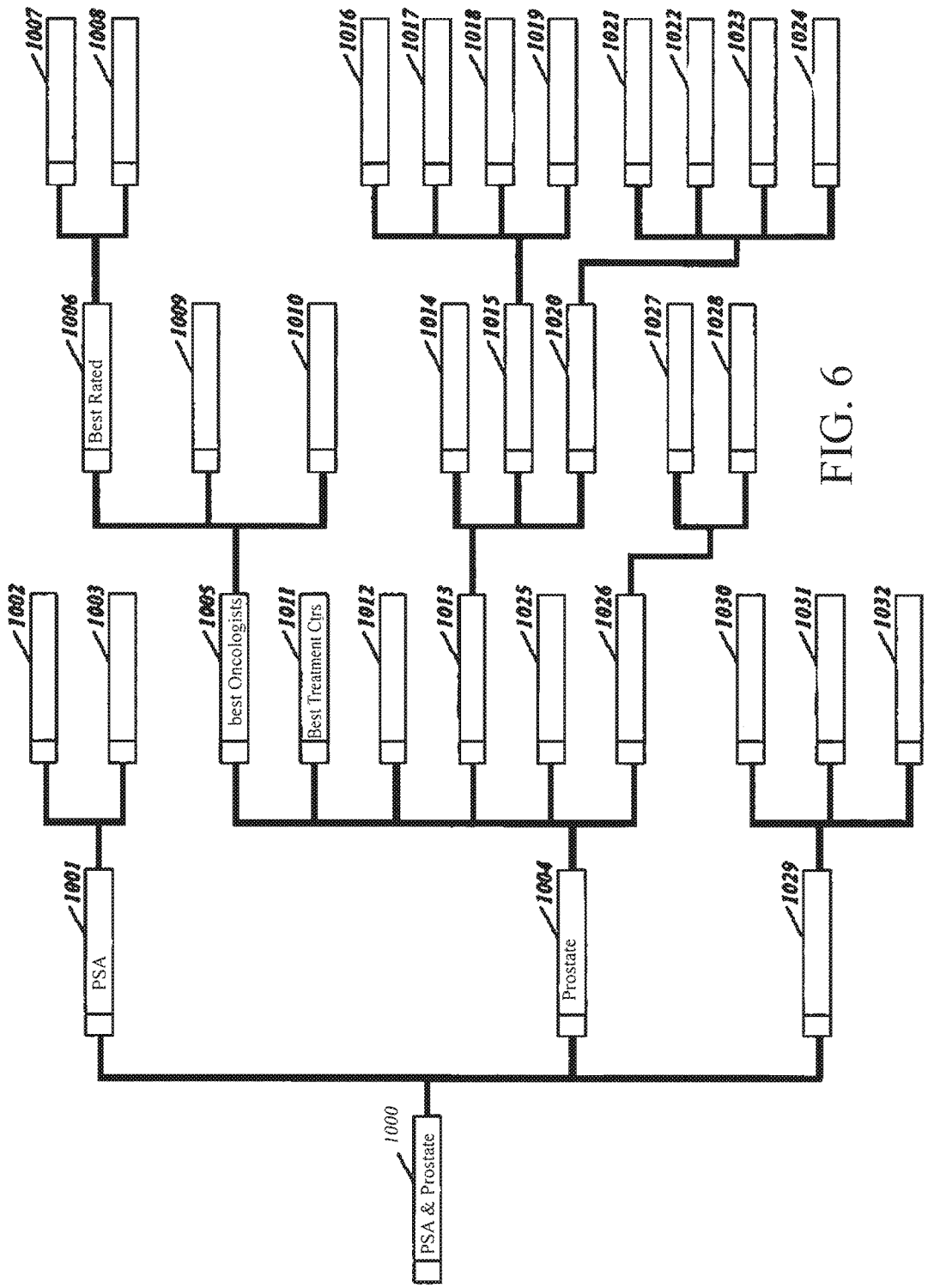
FIG. 6 shows a hierarchical index file organization structure, for indexing and linking information to its plurality of different file locations.

FIG. 6 shows a hierarchical index file organization structure, for indexing and linking information to its plurality of different file locations. A single top level of the hierarchy is shown as psaAndProstateResearch at 1000, and this leads to three main topics including "Prostate" 1004, which in turn leads to six subtopics including "Best Oncologists" 1005, which in turn leads to three subtopics including "Best Rated" 1006, which links to the associated data objects on the non-transitory storage 106 via HTML at 1007, 1008.

Task control related index files are similar but additionally may include calendar dates for calendaring of tasks. Task control related index files may be viewed in a succession of specialized calendars including a master calendar, or special {user specified} calendars). This facilitates the viewing of task dependencies, appointments, phone calls required to be made, and may link to other index files for viewing of other information residing in detail, main, or any other files or folders accessible via html. The invention Master calendar page allows easy access to task items by date and time. The invention also provides additional task item displays including tasks by subject (including a summary/breakdown of total tasks and task attributes for the respective subject), tasks by subject/sub-topic/s (including a summary/breakdown of total tasks and task attributes for the respective subject/sub-topic/s), tasks by date and time, tasks by priority, tasks by bookmark, tasks containing scheduled appointments or reserved time, tasks containing scheduled phone calls, tasks involving dependencies (including a couple of task displays that are dedicated to showing and managing the absences of individuals), and a to-do list of tasks sorted by upcoming tasks and remaining (past) highest priority tasks (or the converse of this combination).

'Main' (mini-database) related files operate similarly and are all very tightly associated with their respective subject/subtopic(s), and may also be tightly integrated with task control and detail files whenever desired or necessary. The virtual directory system checklist and status files (as many as desired per 'Main' file, limited only by machine storage capacity, and viewable by item number, name, or ID) are examples of 'Main' related files providing even more control of information, with the same tight association and integration. Additional highly useful features of 'Main' files are that they can exist at any subject/sub-topic(s) level of the virtual directory system, do not require database queries, can be viewed by item number, name, or ID, and can be used to partially or completely "shadow" an existing external database (shadowing is a data backup technique in which an identical copy of a database is maintained on a local (onsite) and/or a remote (offsite) computer. Thus, while maintaining the primary and an alternate key, the 'Main' file can be used to keep additional and/or more free-form information about subsets of items in the existing external database.

The linked subject/subtopic/s aspect of the foregoing allows tighter organization, cohesion, and navigation than prior art systems. This unique methodology provides the ability to very easily break out info in a detail file to sub-topic detail files, or do the reverse: integrate sub-topic files back into parent detail files, and possibly create extracted/converted standalone files, while maintaining all the features mentioned above, including improved navigation, integration, versatility, overall functionality, etc.

The virtual directory system described above is "virtual." It does not store actual file data. Rather, it points or directs one to the location where the file data is stored and can keep track of file attribute information in order to identify and display all or part of the file data. In contrast, the native file directory system is directly coupled to the physical file storage devices themselves, such that a call to the native file directory system is essentially directed at the physical storage device itself.

The present virtual file directory system does not affect the existing native file directory system. The native file directory system can still be used as usual by the computer system, and there is no loss of compatibility with legacy programs where an NTFS directory system is implemented. Rather, the virtual directory system enhances the file system. One of ordinary skill in the art will appreciate that compatibility of a new file system with existing application programs is essential for commercial software. The virtual directory system can provide this, while others have apparently not been able to do so. The present system is designed to maximally leverage the existing, original folder and file system of the operating system to intuitively obtain the most value from information, in ways that have not been done before.

For example, html-indexed files/displays and their tagged and indexed links (which are primarily delivered with folders, detail files, task control files, and list/database-like files/structures) allow the user to intuitively maximize and integrate the value and utility of information. This is done while benefiting from, and easily navigating between, fully streamlined or expanded, including multi-perspective, multiple sort, multi-level of detail, history/non-history, and file traversal views/options, all from the comfort and familiarity of the original folder and file system of the operating system. This is because every index folder and file is tree-linked to original folders in the file system of the operating system. All vital information, including the full multi-perspective view of all related tasks, is accessible from the base (alphabetically listed, including all nested sub-topics) Table of Contents (TOC) display. This comprehensive, consolidated, functionality-intensive TOC display, includes/demonstrates the ability of any file or folder within the operating system to be placed within a virtual index folder, thereby gaining the huge advantage of intuitive, easy access navigation (and de facto pinpoint organization and classification) by corresponding subject/sub-topic/s.

There are various other benefits of the virtual file directory subject/sub-topic/s orientation of the invention. The 'file categories' feature permits immediate access to folders, files, and related tasks of all subject/sub-topic/s matching user specified partial subject or sub-topic names (such as 'invoices', 'solutions', 'procedures', or 'policies'). The 'All Email Attachments' display provides, in subject/sub-topic/s order, immediate access to any email attachment pertaining to any desired subject or sub-topic, including at any nested level—along with a brief summary of the email that contained it.

In addition, metrics-type analytics and reporting can be performed on the virtual index files.

It should now be apparent that the invention provides intuitive subject/sub-topic/s nested to any desired level, limited only by machine storage capacity. The user views topics/subtopic/s using a conventional browser loading a variety of HTML pages.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A computer system for data storage comprising:
non-transitory memory formatted and indexed according to a disk file system using a hierarchical directory structure;

a data repository comprising a plurality of data objects stored on said non-transitory disk memory and organized within the hierarchical directory structure;

a plurality of index files stored on said non-transitory memory, which contribute to the cross-referencing of each said data object to a HyperText Markup Language (HTML) link to a position of said data object within said hierarchical directory structure, said plurality of index files including three defined index file types consisting of 'task control' files; detail files, and main files, and each said index file possibly contributing to the linking between at least two of said data objects;

computer instructions stored on said non-transitory memory for generating HTML links to and between said data objects, thereby allowing data objects themselves to be both the source of one or more possible navigation requests and also contain one or more destination HTML links for navigation requests from other data objects; and computer instructions stored on said non-transitory memory that control the creation and destination of said data objects in a manner that includes the ability to navigate to and access said data objects by said HTML links.

2. The computer system according to claim 1, wherein each of said three defined index file types contain one or more data object links.

3. The computer system according to claim 2, wherein each of said three defined index file types contain user customized file parameters.

4. The computer system according to claim 3, wherein said data objects includes any one or more from among a group web pages, multimedia files, text files, applets, applications, data files, executable code, upgrades to applications, and links to data objects.

5. The computer system according to claim 1, wherein said computer instructions create a navigation path comprising a progression of HTML links to more detailed index files.

6. The computer system according to claim 5, wherein said computer instructions generate links including at least: Least, Less {2 L}, More, 3Lev, 4Lev, All) for the 'detail' files; and for the 'main' files generate links including Least, Less {2 L}, More, All), and links to sort option views by Item Number, Name, and ID, and associated 'checklist and status' file(s) which also include links to said sort option views.

7. The computer system of claim 1, wherein the hierarchical data structure is a Windows File System database, and the navigation capability is created via said computer instructions which provide the ability to interface with the Windows File System database.

8. A computerized method for displaying information from and linking to stored data objects, the method comprising:

providing a plurality of index files for selection by a user arranged and linked in a tree-like structure with topical index files linked to one or more sub-topical index files including three defined index file types consisting of 'task control' files; detail files, and main files, linked to data objects stored in non-transitory computer memory; and allowing a user to navigate said index files by receiving a user selection of a topical index file and if sub-topical navigation is desired, navigating to a sub-topical index file at any desired nested level and to a data object;

controlling a computer display to display an abstract of the user selected topical index file or sub-topical index file at any desired nested level and a more detailed abstract of the topical index file or sub-topical index file at any desired nested level, and full detail of the data object during said user navigation.

9. A computer-readable storage medium having computer-executable instructions for performing the method recited in claim 8.

10. A system for accessing digital data comprising a digital computer programmed with control software comprising computer instructions stored on non-transitory computer memory for storing data objects in non-transitory disk memory formatted and indexed according to an existing disk file system using a hierarchical directory structure, comprising a virtual directory system including a database of linked index files each defining a position of one or more of said data objects in said hierarchical directory structure, said index files including three defined index file types consisting of 'task control' files; detail files, and main files, and each said index file comprising an HTML document corresponding to one of said stored data objects, each said HTML document further comprising a plurality of metadata links arranged in a tree-and-branch virtual directory classification index having at least two levels inclusive of a main table of contents (TOC) and a sub-table of contents (sub-TOC).

11. The system for accessing digital data according to claim 10, wherein each said HTML document comprises a navigable HTML data object, and said system further comprises a user interface for navigation and display of said navigable HTML data objects.

12. The system for accessing digital data according to claim 11, wherein each said navigable HTML data object comprises said plurality of metadata links arranged in a tree-and-branch virtual directory classification index.

13. The system for accessing digital data according to claim 12, wherein said navigable HTML data objects include a link to one of a 'detail file' and a link to a 'main' file, said main file containing a list of one or more items and associated attributes corresponding to the 'main' file.

* * * * *